Figure 1:
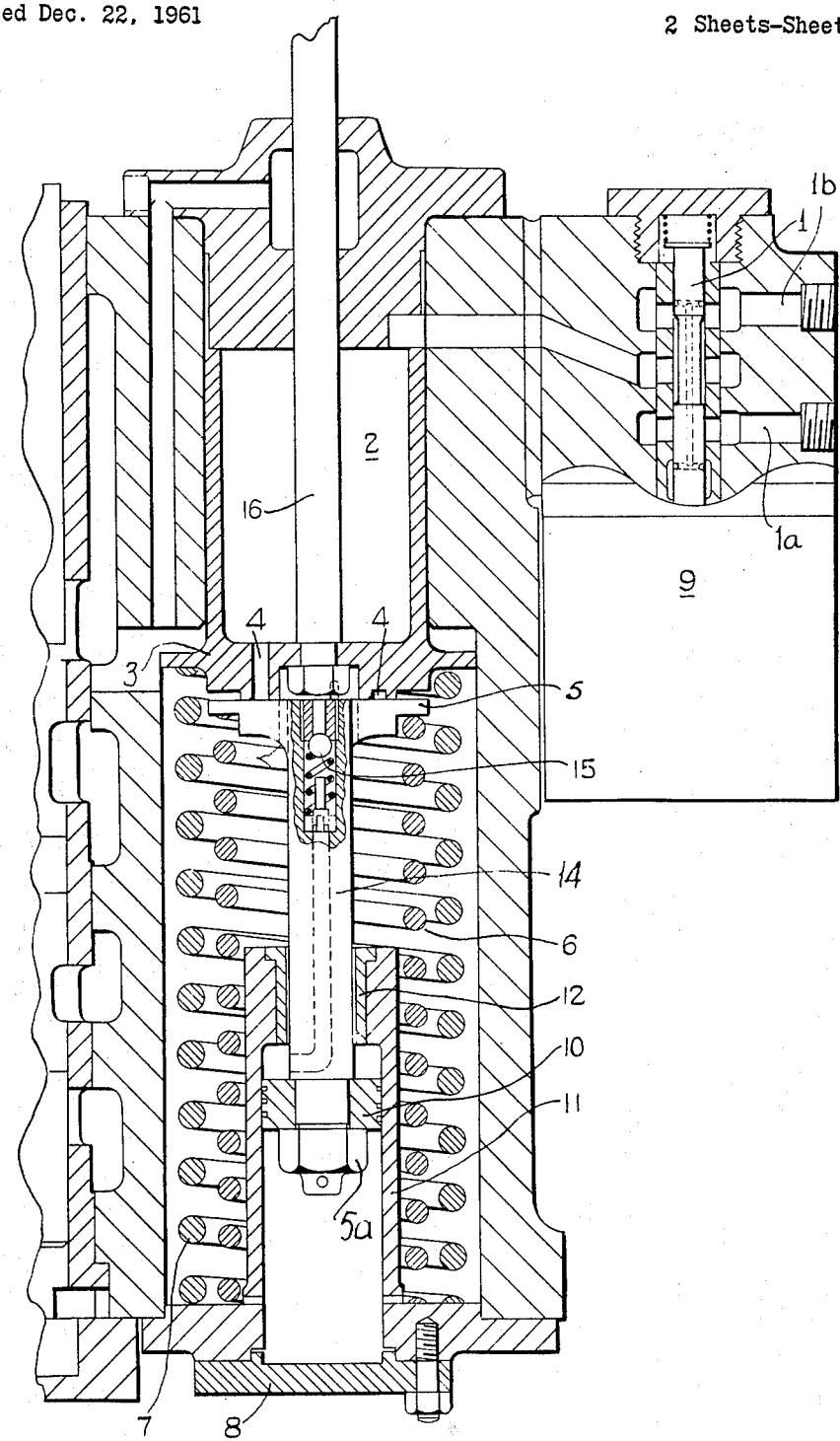

United States Patent Office 3,209,772
Patented Oct. 5, 1965

3,209,772
SPEED CONTROL GEAR FOR TURBINES
Myles Birkett Atkinson, Stretford, and Frederick Harry Barratt, Poynton, England, assignors to Associated Electrical Industries Limited, London, England, a British company
Filed Dec. 22, 1961, Ser. No. 161,704
Claims priority, application Great Britain, Dec. 28, 1960, 44,458/60
5 Claims. (Cl. 137—30)

The present invention relates to an improved speed control gear for turbines and especially to overspeed limiting gear for steam turbines of the kind in which steam valves, i.e., emergency valves or governor valves, are included in a hydraulic circuit comprising means automatically responsive to increase of speed due to loss of load.

When a turbine-generator set suffers a sudden large loss of load, there is a temporary rise in speed due to time lags in the governing system, and to steam already entrained in the turbine. For many years a type of overspeed limiting gear has been employed to reduce this temporary speed rise.

It consists of an electrical circuit capable of distinguishing between normal load changes and a sudden large reduction in load which is likely to produce a high momentary speed rise. In the latter event, solenoids co-operating with specially provided oil pilot valves are energised for a limited period, thus releasing oil from steam control valves, i.e., either emergency valve or governor valves. This causes these valves to close, thereby shutting off the steam to the turbine more rapidly than is achieved by the normal speed governing system. The equipment automatically resets after a few seconds thereby restoring control of the turbine to the speed governing system.

Under the exacting conditions imposed by modern turbines having a high maximum rate of acceleration, it has been found desirable to increase the speed of operation of the overspeed limiting gear, and tests have shown that a period exceeding half the time taken for the control gear to operate may have elapsed between the loss of load and the first movement of the turbine valves.

An object of the invention is to increase the speed of the control operation by replacing the large solenoid in the known overspeed limiting gear by a combination of a small solenoid, which, by virtue of its smaller inertia, will necessarily have a short time constant i.e. a more rapid response, and to combine this with an oil supply valve and a high speed oil relay.

More particularly, the overspeed limiting gear for turbines comprises an electro-hyldraulic mechanism for controlling the turbine valves and including a high speed oil relay controlled by a solenoid of short time constant, the said oil relay having a spring-returned main hydraulic piston and cylinder with a drain port controlled by the solenoid and one or more pressure fluid release ports of greater capacity, which are normally closed and means for instantaneously opening these ports due to drop of pressure in the hydraulic pressure cylinder upon operating of the solenoid.

The means for opening the pressure release ports comprises a valve member forming part of a dash-pot, and retained in position to close the said release ports by the fluid pressure in the relay cylinder acting against the force of return springs, said springs tending to return both the piston of the oil relay and the dash-pot valve, which valve is retarded to lag behind the spring return movement of the hydraulic piston and thus to uncover the release ports.

Figure 2:
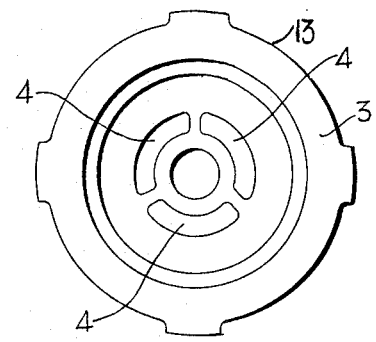
Figure 3:
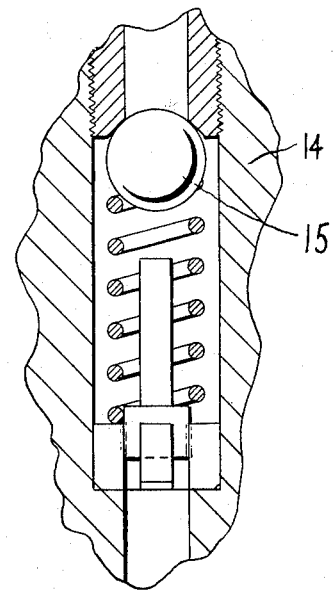

An example of the gear according to the invention is illustrated in the overspeed condition in the accompanying drawings, wherein:

FIG. 1 is a section along the axis of the oil relay;
FIG. 2 is a plan of the piston head; and
FIG. 3 is an enlarged detail of the non-return valve.

In the normal running position, oil from a pump is admitted through the inlet port 1a of solenoid operated valve 1 to the pressure cylinder 2 above the piston main 3 of the oil relay. The ports 4 in the head of piston 3 are normally closed by the spring-loaded valve 5 so that the oil pressure in chamber 2 forces piston 3 down against the resistance of return springs 6 and 7 until the nut 5a on the lower end of the stem 14 of valve 5 comes against a stop plate 8.

On a sudden loss of load, the solenoid 9 is energised, thus moving the valve 1 upwards (FIG. 1 position), shutting off the supply of relay oil and opening the chamber 2 to drain through port 1b.

The stem of the valve 5 constitutes a plunger rod to which is attached a piston 10 free to slide within a cylinder 11. In the top of the cylinder 11 is fitted a bush 12 there being a small clearance for oil to enter between the bush 12 and the stem of valve 5. The piston 10, cylinder 11 and bush 12 thus constitute a dash-pot, and when the oil pressure in chamber 2 falls upon operation of the solenoid valve 1, piston 3 returns rapidly under the force of spring 7, while the valve 5, although acted upon by spring 6, is delayed by the dash-pot, and so lags behind, thus opening the large capacity release ports 4 and permitting the oil in chamber 2 to flow through piston 3, so that piston 3 can rise very rapidly. Oil displaced upwardly during this operation passes through the open drain port 1b, the remainder being kept in the spring housing. The plan view of piston head 3 shows the edges of the locating flange 13 considerably cut away also to reduce the resistance of the oil to the motion of the piston 3. The latter can therefore move in the housing enclosing the return springs 6 and 7 even when the housing is charged with oil.

As the piston 3 rises it raises piston rod 16 which in turn operates the pilot valve (not shown) controlling the steam valve.

After piston 3 has left valve 5, the latter continues to rise relatively slowly and after a short time once more comes into the position of FIG. 1 where it is in contact with piston 3 reclosing the ports 4.

If now the solenoid ceases to be energised, valve 1 will be lowered closing the drain port and permitting relay oil under pressure to flow again into the chamber 2 of the oil relay, forcing piston 3 and valve 5 down. To prevent the formation of a partial vacuum in the dash-pot and consequent cavitation of the oil a non-return valve 15 is provided in that end of the plunger 14 adjacent the valve 5 to enable oil to enter the dash-pot from outside.

This gear according to the invention operates considerably faster than the conventional solenoid controlled gear because the electrical component is a very small solenoid having a short time constant, and as soon as the solenoid has operated large oil release ports are opened in the piston 3 which can then rise rapidly under the influence of the powerful spring 7.

The solenoid time constant may be further reduced by the use of a low voltage rated solenoid in series with a large resistor.

What we claim is:
1. An overspeed limiting device for use with turbines, comprising: a main piston working in a main cylinder, said main piston having an operating rod adapted to be connected to operate the admission valves of a turbine with which the device may be used; a solenoid adapted for automatically responding to load changes of a turbine with which the device is to be used; a valve operatively connected to said solenoid to admit fluid under pressure to one side of said main piston when said solenoid is in a position corresponding to normal running speed and to relieve pressure from said one side of said main piston when said solenoid is in a position corresponding to an overspeed condition; a spring for moving said main piston in opposition to the force of said pressure fluid; release ports in said main piston for permitting pressure fluid to pass from said one side of said main piston to the other side thereof; a spring-loaded valve member urged against said other side of said main piston for closing said release ports, said valve member being movable with said main piston; and means for delaying movement of said valve member when said piston moves in response to relief of pressure fluid from said one side, whereby said relief passages are opened to allow rapid discharge of pressure fluid from said one side of said main piston and consequent rapid actuation of the valves of a turbine with which the device is being used.

2. An overspeed limiting device according to claim 1, wherein the means for delaying the movement of said valve member comprises a dash-pot plunger and piston connected to the valve member; said main piston having a flange which is cut away at the periphery to reduce the resistance offered by the liquid when the piston head is moved under the return thrust of its spring in a chamber which houses the return springs for the main piston and the dash-pot piston.

3. An overspeed limiting device according to claim 2, including a non-return valve associated with the piston of the dash-pot to enable oil to enter the dash-pot from the outside, whereby to prevent a partial vacuum and consequent cavitation of the oil.

4. An overspeed limiting gear according to claim 3, wherein the non-return valve is a ball valve seated in an axial bore at that end of the dash-pot plunger adjacent the valve for covering the release ports for the main piston and cylinder.

5. An overspeed limiting gear according to claim 4, wherein the solenoid is of low voltage rating and is employed in series with a high value resistor to enhance the short time constant effect.

References Cited by the Examiner
UNITED STATES PATENTS

| | | | |
|---|---|---|---|
| 704,270 | 7/02 | Reynolds | 73—522 |
| 1,265,883 | 5/18 | Church | 73—522 |
| 1,950,594 | 3/34 | Bryant | 137—36 X |

FOREIGN PATENTS

| | | |
|---|---|---|
| 168,589 | 2/22 | Great Britain. |

ISADOR WEIL, *Primary Examiner.*

M. CARY NELSON, *Examiner.*